(12) United States Patent
Turner et al.

(10) Patent No.: US 10,791,380 B2
(45) Date of Patent: Sep. 29, 2020

(54) SYSTEM AND METHOD FOR PROVIDING DEFAULT SELECTIONS AMONG AGGREGATED UNIVERSAL PROGRAM INFORMATION

(71) Applicant: Verizon Patent and Licensing Inc., Arlington, VA (US)

(72) Inventors: Devon G. Turner, San Francisco, CA (US); Krishnaja Gutta, San Francisco, CA (US); Suri B. Medapati, San Jose, CA (US); David McKeown, San Jose, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 178 days.

(21) Appl. No.: 16/024,982

(22) Filed: Jul. 2, 2018

(65) Prior Publication Data

US 2020/0007952 A1    Jan. 2, 2020

(51) Int. Cl.
| | |
|---|---|
| *H04N 21/6587* | (2011.01) |
| *H04N 21/442* | (2011.01) |
| *H04N 21/472* | (2011.01) |
| *H04N 21/485* | (2011.01) |
| *H04N 21/433* | (2011.01) |
| *H04N 21/45* | (2011.01) |
| *H04N 21/2387* | (2011.01) |

(52) U.S. Cl.
CPC ..... *H04N 21/6587* (2013.01); *H04N 21/2387* (2013.01); *H04N 21/4334* (2013.01); *H04N 21/44222* (2013.01); *H04N 21/4532* (2013.01); *H04N 21/47217* (2013.01); *H04N 21/4856* (2013.01)

(58) Field of Classification Search
CPC .......... H04N 21/6587; H04N 21/2387; H04N 21/4334; H04N 21/44222; H04N 21/47217; H04N 21/4856; H04N 21/4532; H04N 21/4826; H04N 21/47202; H04N 21/84
See application file for complete search history.

(56) References Cited

U.S. PATENT DOCUMENTS

| | | | |
|---|---|---|---|
| 2006/0143655 A1* | 6/2006 | Ellis ...................... | H04N 5/445 |
| 2008/0141317 A1* | 6/2008 | Radloff .................. | H04N 7/173 |
| 2016/0249097 A1* | 8/2016 | Shoykhet ......... | H04N 21/44204 |

* cited by examiner

*Primary Examiner* — Anthony Bantamoi

(57) ABSTRACT

Systems and methods present to a user a single option when multiple sources (such as recording, on-demand, live airing, etc.) of a video asset exist in aggregated universal program information. The systems and methods compare metadata from asset variants along with user profile data to identify which option will provide the best user experience for the selected video asset. The systems and methods simplify the user experience to avoid forcing the user to choose between multiple options.

20 Claims, 14 Drawing Sheets

FIG. 7A

| Trumping Priority 710 | Content Type 720 | Airing 730 | If multiple asset choices with the same criteria... 740 | Language 750 | Content Version 760 | Metadata narrative to present 770 |
|---|---|---|---|---|---|---|
| 0 | PPV-InDemand | Airing Now | | User Default > English > other languages | 4K SDR > HD HDR > HD > SD | If purchased or not (prior to event date/time): "Event airs: x:xx{pm} 1/1/2018, <enhanced callsign>" <br><br> If purchased (after event date/time): "3-Day Rewind: Expires 1/1/2018, <enhanced callsign>" <br><br> Not purchased (after event first air time): "Next airing: x:xx{pm} 1/1/2018, <callsign>" |
| | PPV Timeblock | | | | 4K SDR > HD HDR > HD > SD | If purchased or not and airing now or future: "This program airs as part of a six hour subscription window." <br><br> If purchased (after event data/time): "3-Day Rewind: Expires 1/1/2018, <enhanced callsign>" |
| 1 | TVOD – previously purchased (entitled) | | | User Default > English > other languages | 4K SDR > HD HDR > HD > SD | "Purchased in <resolution> on 1/1/2009" |

FIG. 7B

| Trumping Priority 710 | Content Type 720 | Airing 730 | If multiple asset choices with the same criteria... 740 | Language 750 | Content Version 760 | Metadata narrative to present 770 |
|---|---|---|---|---|---|---|
| 2 | TVOD – previously rented (entitled) | | | User Default > English > other languages | 4K SDR > HD HDR > HD > SD | "\<Resolution\> rental expires on 1/1/2019"<br><br>"\<Resolution\> rental expires in 7 days" (Countdown starts at 7 days and goes into hours messaging within 24hrs)<br><br>"\<Resolution\> rental expires in 20 hours" (if within 24 hrs expiry) |
| 3 | Linear | DVR - full recording | De-dupe one per channel & choose first aired | User Default > English > other languages | 4K SDR > HD HDR > HD > SD | "Recorded: x:xx{pm} 1/1/2017, \<enhanced callsign\>"<br><br>"Recording in-progress: x:xx{pm} \<enhanced callsign\>" |
| 4 | SVOD – user purchased package | | | User Default > English > other languages | | "Included with \<network\>" (outside 30 days)<br><br>"Included with \<network\> until 1/1/2018" (within 30 days)<br><br>e.g.: Network name value = HBO |
| 5 | Linear, Premium | Catch-up | De-dupe one per channel & choose first aired | User Default > English > other languages | 4K SDR > HD HDR > HD > SD | "3-Day Rewind: Expires 1/1/2018, \<enhanced callsign\>" |

| Trumping Priority 710 | Content Type 720 | Airing 730 | If multiple asset choices with the same criteria... 740 | Language 750 | Content Version 760 | Metadata narrative to present 770 |
|---|---|---|---|---|---|---|
| 6 | Linear, Premium | Airing now | De-dupe one per channel | User Default > English > other languages | 4K SDR > HD HDR > HD > SD | "On now: x:xx[pm], <enhanced callsign>" |
| 7 | SVOD – eligible for purchase | | User Chooses e.g.: When user is going through a content page and there are 2 eligible Subscription options that allow playback. Edgewise scenario | User Default > English > other languages | 4K SDR > HD HDR > HD > SD | "Included with <network>" (content expiration window > 30 days) "Included with <network> until 1/1/2018" (content expiration window < 30 days) |
| 8 | AVOD (trick play enabled) | | Choose one with latest avail window (in order for the user to resume watching over a longer time period) | User Default > English > other languages | 4K SDR > HD HDR > HD > SD | "Available to watch free on-demand", <provider/network> "Free on-demand: Expiring on 1/1/2018" (if FVOD window ends in the next 3 days) |
| 9 | AVOD (trick play disabled) | | | User Default > English > other languages | 4K SDR > HD HDR > HD > SD | "Free on-demand: Expires 1/1/2018, <provider/network>" (content expiration window > 30 days) "Free on-demand: <provider/network>" (content expiration window < 30 days) |

| Trumping Priority 710 | Content Type 720 | Airing 730 | If multiple asset choices with the same criteria... 740 | Language 750 | Content Version 760 | Metadata narrative to present 770 |
|---|---|---|---|---|---|---|
| 10 | Linear, advertising | Catch-up | De-dupe one per channel & choose first Aired. In case of sports, choose "Live" catch up airing over replay catchup | User Default > English > other languages | 4K SDR > HD HDR > HD > SD | "3-Day Rewind: Expires 1/1/2018, <enhanced callsign>" |
| 11 | Linear, advertising | Airing now | De-dupe one per channel | User Default > English > other languages | 4K SDR > HD HDR > HD > SD | "Airing now on <enhanced callsign>" |
| 12 | Linear, any | DVR, partial recording | | | | "Recorded: x:xx{pm} 1/1/2017, <enhanced callsign>" |
| 13 | TVOD, expired rental | | No play options | User Default > English > other languages | 4K SDR > HD HDR > HD > SD | "Available for purchase" (if purchase only) "Available for purchase / rental" (if purchase and rental available) |

| Trumping Priority 710 | Content Type 720 | Airing 730 | If multiple asset choices with the same criteria... 740 | Language 750 | Content Version 760 | Metadata narrative to present 770 |
|---|---|---|---|---|---|---|
| 14 | TVOD, preorder | | | User Default > English > other languages | 4K SDR > HD HDR > HD > SD | Pre-purchase:<br>"Available on 1/1/2018" (if known availability date)<br>"Available for pre-order" (if no known availability date)<br><br>Post purchase:<br>"Pre-ordered <resolution> - available on 5/1/2018." (if known availability date)<br>"Pre-ordered <resolution> on 1/1/2018" (if no known availability date) |
| 15 | Linear, upcoming airings | | No play options | User Default > English > other languages | | If recording scheduled:<br>"Recording at: x:xx{pm} 1/1/2017, <enhanced callsign>"<br><br>If upcoming airing is not new:<br>"Next airing: x:xx{pm} 1/1/2018, <enhanced callsign>"<br><br>If upcoming airing is new:<br>"New airing: x:xx{pm} 1/1/2017, <enhanced callsign>" |
| 16 | TVOD, not yet purchased | | | | | "Available for purchase" (if purchase only)<br>"Available for purchase / rental" (if purchase and rental available) |

700 →

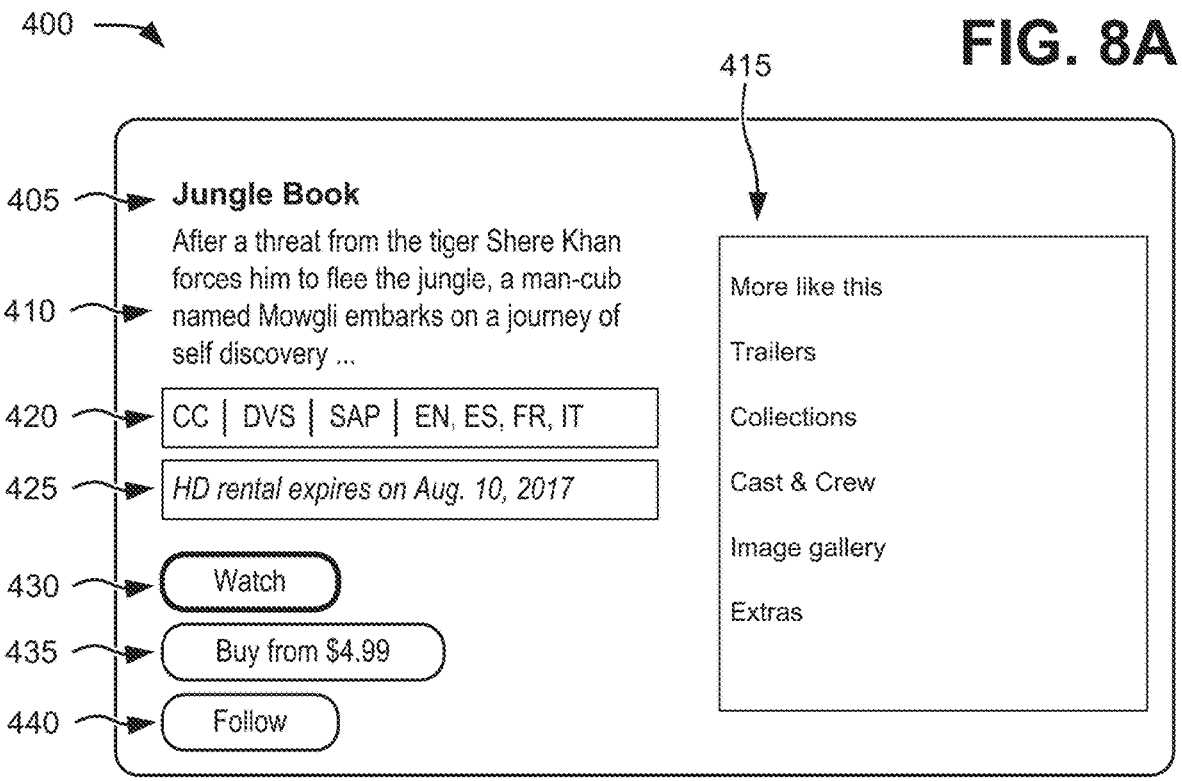
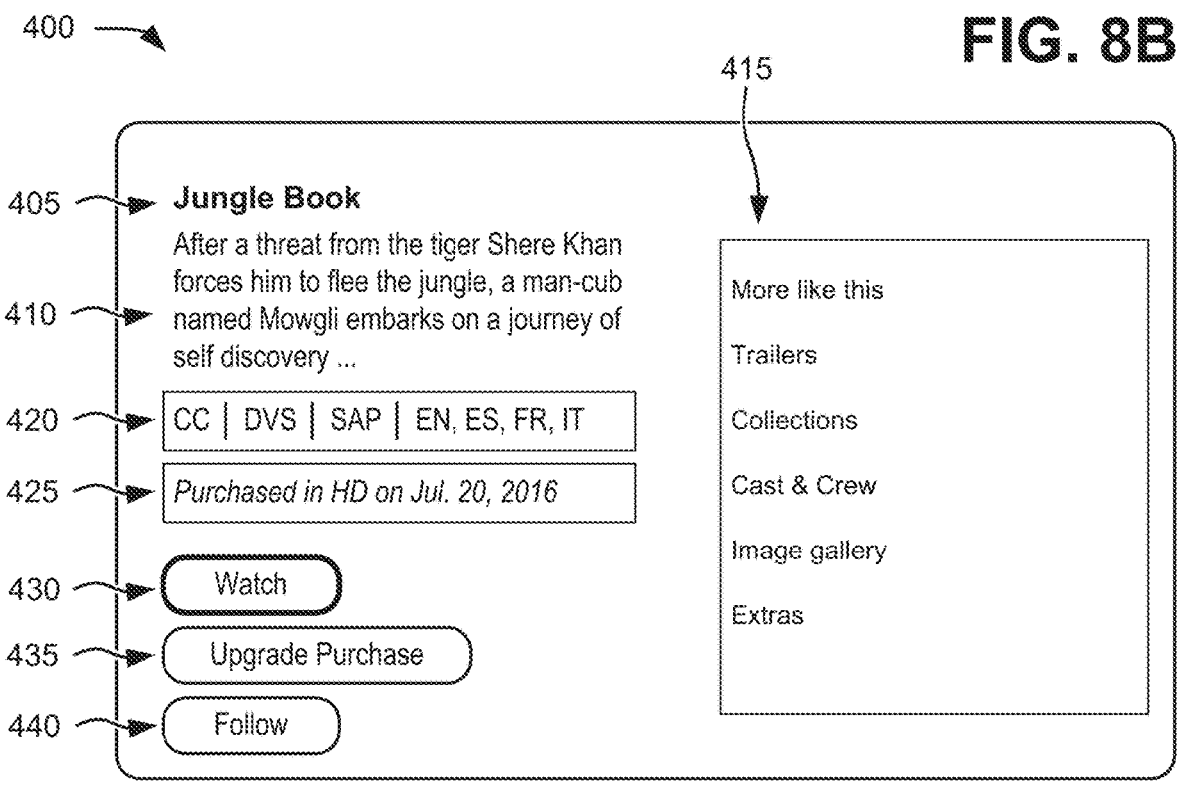

US 10,791,380 B2

SYSTEM AND METHOD FOR PROVIDING DEFAULT SELECTIONS AMONG AGGREGATED UNIVERSAL PROGRAM INFORMATION

BACKGROUND

Along with live linear television content, service providers also offer products that allow customers to download video content (e.g., streaming video, video files, etc.) on demand over a distribution network. Broadcast content options may be presented to the customer via an electronic program guide. Access to on-demand video content is typically presented to the customer via a catalog of available items. Customers may supplement options for live linear television and/or on-demand content with locally-recorded content, such as content from a digital video recorder (DVR). User interfaces for selection of each of these various types of content options are typically segregated, requiring a user to select a type of content before choosing an item (or asset) to view.

In contrast with the segregated selection options mentioned above, universal program information pages can link multiple sources of content for a single asset. However, when multiple sources (e.g., recording, on-demand, live airing, etc.) of an asset exist, the viewer can be left with a confusing choice of determining which version of a selected asset to select.

BRIEF DESCRIPTION OF THE DRAWINGS

FIGS. 7A-7E illustrate an example of a default selection plan for selecting among aggregated universal program information; and FIGS. 8A-8F are exemplary user interfaces for presenting default selections among aggregated universal program information, according to an implementation described herein.

DETAILED DESCRIPTION OF PREFERRED EMBODIMENTS

Figure 1:
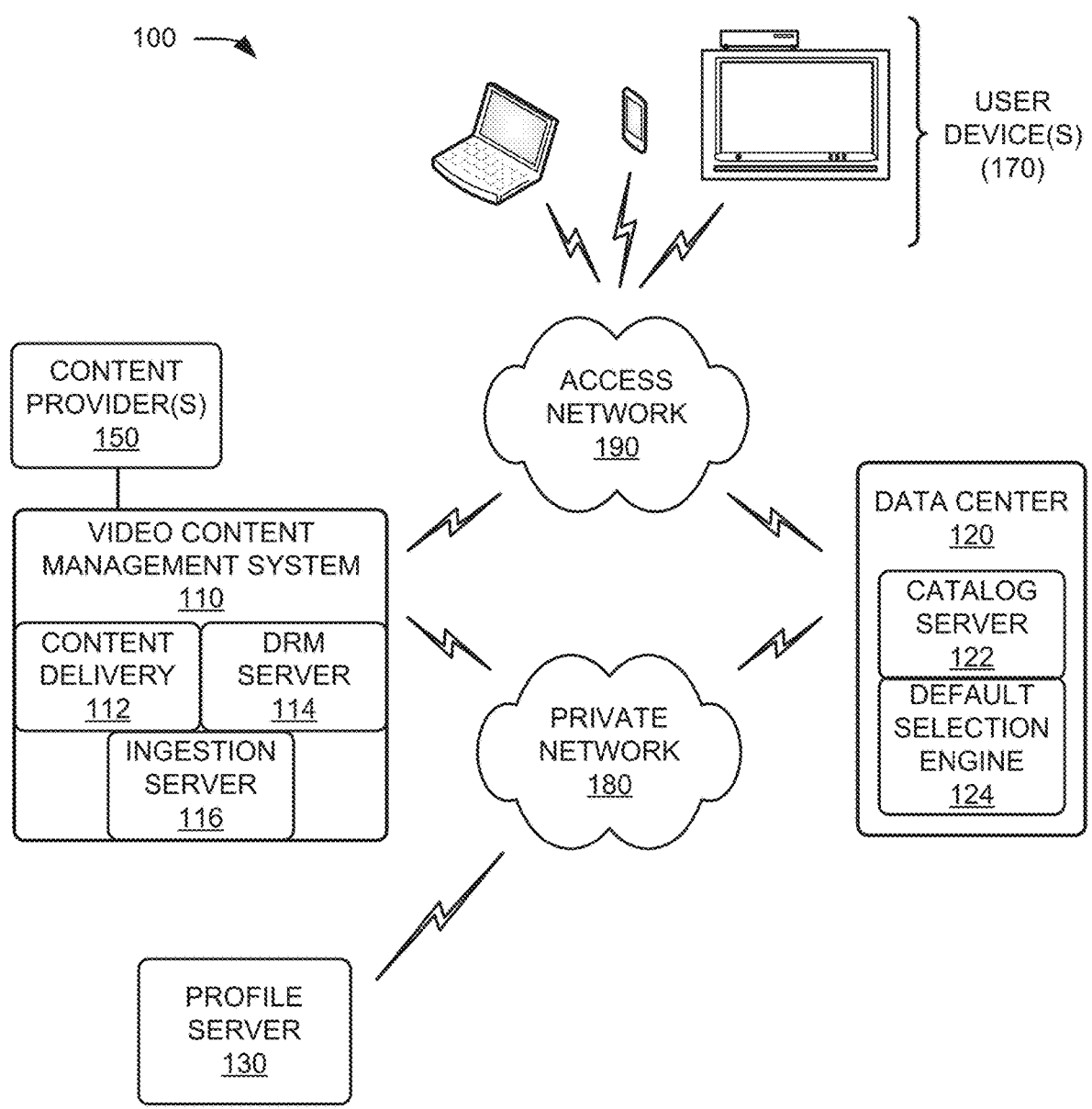
FIG. 1 is a diagram of an exemplary network in which systems and/or methods described herein may be implemented.

The following detailed description refers to the accompanying drawings. The same reference numbers in different drawings may identify the same or similar elements.

Video content may be available from many sources and may be delivered to users through a variety of methods. For example, video content may be available from commercial broadcasting television networks (e.g., ABC, CBS, NBC, FOX, etc.) via free broadcast; from a cable television network (e.g., CNN, TNT, TBS, etc.) for a periodic subscription fee; from a premium cable channel (e.g., HBO, from a satellite television service (e.g. DIRECTV, DISH Network, etc.) for a periodic subscription fee; from a pay-per-view service; from an on-demand video service; and/or from over-the-top (OTT) content providers on the Internet (e.g., NETFLIX, HULU, VUDU, YOUTUBE, etc.). Video content may be delivered to users, for example, via a set top box, a computer device, or a wireless mobile device.

Universal program information pages can associate multiple sources (e.g., recording, on-demand, live airing, etc.) with a particular asset so that a user is not required to search through separate catalogs from each source to identify a particular version of an asset to view. For example, a user may select or enter an asset title (e.g., "Iron Man") that is available through the particular user's account as a video-on-demand (VOD) asset, premium channel content (e.g., live linear content, such as SHOWTIME or HBO), and a digital recording (e.g., a digital video recorder (DVR) file). All of the multiple asset variants to which the user has access can be presented in a single user interface page as aggregated universal program information for the selected program title. However, providing the aggregated universal program information to the user introduces a different level of complexity to the selection processes, in that the user is still left to choose from one of the multiple asset variants presented.

As used herein, the term "asset variants" may be considered assets with content having the same tile and descriptive information, except for the source. For example, "Iron Man" on a premium channel (e.g., HBO), "Iron Man" via VOD, and "Iron Man" via a basic channel (e.g., AMC) may be variants of the same asset. Conversely, asset versions (e.g., with different titles or descriptions) may be considered different assets. For example, the movie "Blade Runner" may have three versions: "Blade Runner," "Blade Runner, Final Cut," and "Blade Runner, Director's Cut," none of which would be considered asset variants of each other.

Systems and methods described herein select an optimal asset variant to present to a user when a title selection corresponds to multiple asset variants from aggregated universal program information. The systems and methods compare metadata from asset variants along with user profile data to identify which option will provide the best user experience for the selected video asset. The systems and methods simplify the user experience to avoid forcing the user to choose between multiple options and may reduce network traffic associated with viewing an unwanted asset for a brief period of time before the user selects another asset variant.

FIG. 1 is an exemplary network 100 in which systems and/or methods described herein may be implemented. As illustrated, network 100 may include a video content management system (VCMS) 110, a data center 120, a profile server 130, one or more content providers 150, user devices 170, a private network 180, and an access network 190. In one implementation, VCMS 110, data center 120, profile server 130, and private network 180 may be part of a content distribution network. The particular arrangement and number of components of network 100 shown in FIG. 1 are illustrated for simplicity. In practice there may be more VCMSs 110, data centers 120, profile servers 130, content providers 150, user devices 170, or networks 180/190. Components of network 100 may be connected via wired and/or wireless links.

VCMS 110 may include one or more network devices, or other types of computation or communication devices, to aggregate content and content metadata, process content, and distribute content. In one implementation, VCMS 110 may include a content delivery system 112, a digital rights management (DRM) server 114, and an ingestion server 116. VCMS 110 may ingest and aggregate content, and transcode content into a digital format suitable for consumption on particular user devices 170. For example, VCMS 110 may include a transcoding device to convert a video file from one format to another (e.g., from one bit rate to another bit rate, from one resolution to another, from one standard to another, from one file size to another, etc.). VCMS 110 may also encrypt data and communicate with DRM server 114 to enforce digital rights.

Content delivery system 112 may include one or more network devices, or other types of computation or communication devices, to deliver multimedia content from a backend server to user devices 170. In one implementation, content delivery system 112 may include a streaming server that provides streaming data packets (e.g., via a streaming uniform resource locator (URL)) to user devices 170 (e.g., via network 180).

DRM server 114 may include one or more network devices, or other types of computation or communication devices, to issue, validate, and/or enforce DRM licenses to a client, such as an application running on one of user devices 170. In implementations described herein, DRM server 114 may communicate with user device 170 to authenticate a user of user device 170, the particular user device 170, and/or an application residing on user device 170. For example, DRM server 114 may request/receive device information (e.g., a unique device identifier) associated with user device 170 and may compare the device information with stored information to authenticate user device 170.

Ingestion server 116 may include one or more network devices, or other types of computation or communication devices, to collect, generate, and/or classify metadata of incoming content. Ingestion server 116 may identify, for example, a content source (e.g., a pay-per-view (PPV) provider, a transactional VOD (TVOD) provider, a subscription VOD (SVOD) provider, an advertising-based VOD (AVOD) provider, a premium channel, a basic channel, etc.), available resolution (e.g., 4K high dynamic range (HDR), 4K standard dynamic range (SDR), high definition (HD) HDR, HD, standard definition (SD), etc.), available languages (e.g., English, Spanish, French, etc.), available features (e.g., secondary audio programming (SAP), descriptive video service (DVS), and closed captioning (CC), etc.), available services (e.g., multi-day replay, trick play, etc.) associated with individual asset variants. The collected metadata may be associated with the asset variants and may be provided to data center 120 (e.g., catalog server 122) for use in identifying default selections among aggregated universal program information.

Data center 120 may include one or more network devices, or other types of computation or communication devices, to manage the authorization, selection, scheduling, and/or purchase of multimedia content by a user of user devices 170. As shown in FIG. 1, data center 120 may include a catalog server 122 and a default selection engine 124. In one implementation, data center 120 may be accessed by user devices 170 via access network 190.

Catalog server 122 may include one or more network devices, or other types of computation or communication devices, to provide a unified catalog of multimedia content for subscribers (e.g., of user devices 170) to consume (e.g., view, buy, or rent). Catalog server 122 may include, for example, program guide data for television content, on-demand content data, games, etc. In one implementation, catalog server 122 may collect and/or present listings of content available to user devices 170. For example, catalog server 122 may receive content metadata, such as lists or categories of content, from VCMS 110 (e.g., ingestion server 116) and/or profile server 130. Catalog server 122 may use the content metadata to provide currently-available content options to user devices 170. Catalog server 122 may provide the content metadata to user devices 170 directly or may communicate with user devices 170 via another server. According to an implementation, multiple asset variants for a single video title may be compiled using data from catalog server 122 to generate aggregated universal program information.

Default selection engine 124 may include one or more network devices, or other types of computation or communication devices, that provide suggestions and/or recommendations of a specific asset variant of multiple asset variants in aggregated universal program information. Default selection engine 124 may select an asset variant based on user profiles (from profile server 130), catalog metadata (from catalog server 122), or other factors described below. In another implementation, default selection engine 124 may also take into account subscription limits, pre-defined parameters set by parents, etc. Default selection engine 124 is described further, for example, in connection with FIGS. 5-8F.

Profile server 130 may include one or more network devices, or other types of computation or communication devices, to store user profile information for users (e.g., users of user devices 170). Profile server 130 may store per-user and/or per-device records. The user profile information may include various information regarding a user, such as login information (e.g., a user identifier and a password), billing information, address information, types of services to which the user has subscribed, parental control settings, preferred display format, subtitle defaults, preferred language settings, relevant advertising settings, most-watched media, a list of multimedia content purchased/rented by the user, a list of recorded content from a DVR associated with a user device, user device identifiers (e.g., a media player identifier, a mobile device identifier, a set top box identifier, a personal computer identifier, etc.), user devices 170 associated with a user, user content preferences, user tendencies, or the like. In one implementation, profile server 130 may include and/or access a database that includes user/device information from other systems, such as a wireless data service plan. In one implementation, profile server 130 may communicate with default selection engine 124 to provide user profile information for use in selecting a default asset variant from aggregated universal program information.

Content providers 150 may include any type or form of content provider to provide content to VCMS 110 for distribution. For example, content providers 150 may include free television broadcast providers (e.g., broadcast providers, such as NBC, CBS, ABC, and/or FOX) and for-pay television broadcast providers (e.g., TNT, ESPN, HBO, Cinemax, CNN, etc.) that permit content to be streamed and/or downloaded. Content providers 150 may also include on-demand content providers (e.g., TVOD providers, SVOD providers, AVOD providers, PPV providers, etc.), online content providers (e.g., webcasts, podcasts, etc.), etc.

User device 170 may generally include a device that can request and present content provided by VCMS 110. User device 170 may include, for example, a set-top box (STB, e.g., connected to a television), a gaming console, an Internet television, a smart television (e.g., a network-connected television), a computing device with a cable card, etc. In one implementation, viewing device 120 may be a closed device (e.g., including a hardware/software configuration that is not accessible to the general public), such as an STB with a unique identifier (e.g., a serial number) that can be used to associate a particular STB with a particular customer/location. In one implementation, user device 170 may include a DVR which may be integrated with or connected to the STB. In another implementation, user device 170 may include a computation or communication device to enable a user to access content from VCMS 110 (e.g., via a web server). In such implementations, user device 170 may include, for example, a personal communications system (PCS) terminal, a tablet computer, a smartphone, a personal computer, a laptop computer, a wearable computer, or other types of computation or communication devices.

Private network 180 may include, for example, one or more private Internet protocol (IP) networks that use a private IP address space. Private network 180 may include a local area network (LAN), an intranet, a private wide area network (WAN), etc. In one implementation, private network 180 may implement one or more Virtual Private Networks (VPNs) for providing communication between, for example, any of VCMS 110, data center 120, and/or profile server 130. In one implementation, private network 180 may be protected/separated from other networks, such as access network 190, by a firewall. Although shown as a single element in FIG. 1, private network 180 may include a number of separate networks.

Access network 190 may include a LAN, a WAN, such as a cellular network, a satellite network, a fiber optic network, a private WAN, or a combination of the Internet and a private WAN, etc., that is used to transport data. In one implementation, access network 190 may include a managed network that can be used to provide guaranteed service rates and quality of service (QoS) to closed user devices 170 (e.g., STBs). Although shown as a single element in FIG. 1, access network 190 may include a number of separate networks that provide services to user devices 170.

Figure 2:
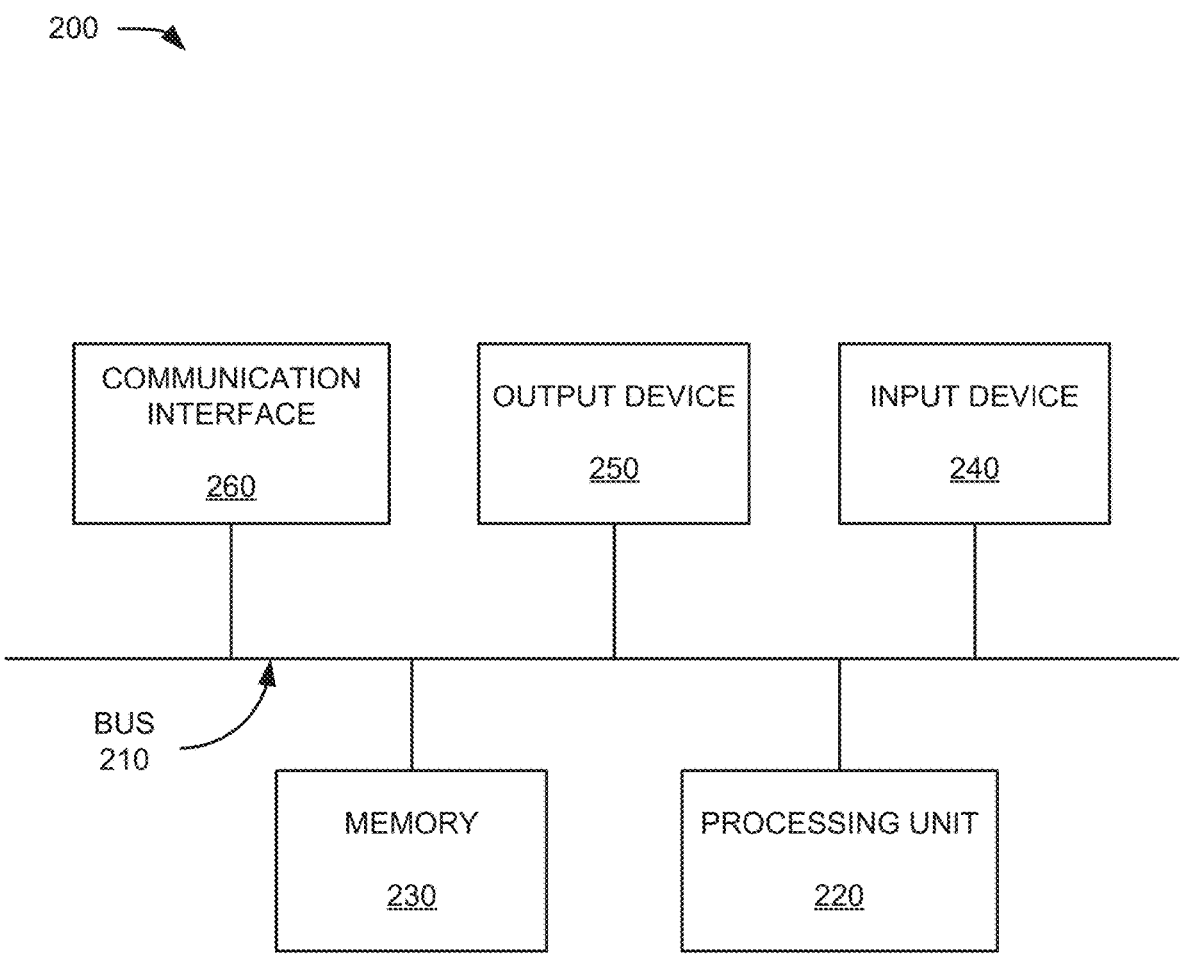
FIG. 2 is a block diagram of exemplary components of a device that may correspond to one or more of the devices of FIG. 1.

FIG. 2 is a diagram of exemplary components of a device 200. Each of VCMS 110, content delivery system 112, DRM server 114, ingestion server 116, data center 120, catalog server 122, default selection engine 124, profile server 130, and user device 170 may be implemented/installed as software, hardware, or a combination of hardware and software, on one or more of device 200. In one implementation, device 200 may be configured as a network device. In another implementation, device 200 may be configured as a computing device. As shown in FIG. 2, device 200 may include a bus 210, a processing unit 220, a memory 230, an input device 240, an output device 250, and a communication interface 260.

Bus 210 may permit communication among the components of device 200. Processing unit 220 may include one or more processors or microprocessors that interpret and execute instructions. In other implementations, processing unit 220 may be implemented as or include one or more application specific integrated circuits (ASICs), field programmable gate arrays (FPGAs), or the like.

Memory 230 may include a random access memory (RAM) or another type of dynamic storage device that stores information and instructions for execution by processing unit 220, a read only memory (ROM) or another type of static storage device that stores static information and instructions for the processing unit 220, and/or some other type of magnetic or optical recording medium and its corresponding drive for storing information and/or instructions.

Input device 240 may include a device that permits an operator to input information to device 200, such as a keyboard, a keypad, a mouse, a pen, a microphone, one or more biometric mechanisms, and the like. Output device 250 may include a device that outputs information to the operator, such as a display, a speaker, etc.

Communication interface 260 may include a transceiver that enables device 200 to communicate with other devices and/or systems. For example, communication interface 260 may include wired or wireless (e.g., radio frequency) mechanisms for communicating with other devices, such as other devices of network 100.

As described herein, device 200 may perform certain operations in response to processing unit 220 executing software instructions contained in a computer-readable medium, such as memory 230. A computer-readable medium may include a tangible, non-transitory memory device. A memory device may include space within a single physical memory device or spread across multiple physical memory devices. The software instructions may be read into memory 230 from another computer-readable medium or from another device via communication interface 260. The software instructions contained in memory 230 may cause processing unit 220 to perform processes described herein. Alternatively, hardwired circuitry may be used in place of or in combination with software instructions to implement processes described herein. Thus, implementations described herein are not limited to any specific combination of hardware circuitry and software.

Although FIG. 2 shows exemplary components of device 200, in other implementations, device 200 may include fewer components, different components, differently arranged components, or additional components than depicted in FIG. 2. As an example, in some implementations, a display may not be included in device 200. In these situations, device 200 may be a "headless" device that does not include an input device. Alternatively, or additionally, one or more components of device 200 may perform one or more other tasks described as being performed by one or more other components of device 200.

Figure 3:
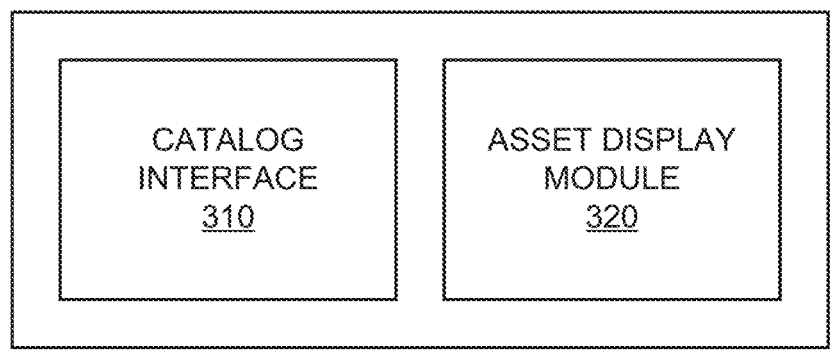
FIG. 3 is a block diagram of exemplary functional components of the user device of FIG. 1.

FIG. 3 is a block diagram of exemplary functional components of user device 170. The functions described in connections with FIG. 3 may be performed by one or more components of device 200 (FIG. 2), such as processing unit 220 executing instructions stored in memory 230. As shown in FIG. 3, user device 110 may include a catalog interface 310 and an asset display module 320.

Catalog interface 310 may allow user device 170 to obtain a list of available content (e.g., both linear and non-linear content) from data center 120 (e.g., catalog server 122). For example, catalog interface 310 may request, from data center 120, a particular asset title or a list of content available for viewing within a particular period. The list of content may be presented to a user of navigation device 110 via catalog interface 310. In one implementation, catalog interface 310 may indicate a user's selection of a particular asset to data center 120 and, in return, may receive (e.g., from default selection engine 124) content metadata for and a link (e.g., a URL) to enable user device 170 to access a default asset variant (e.g., one of multiple asset variants from aggregated universal program information) with a particular resolution and default language.

Asset display module 320 may provide a default selection of an asset variant on a program information screen for a user of user device 170. In one implementation, asset display module 320 may receive a default asset variant selection from data center 120. In another implementation, asset display module 320 may obtain asset variant metadata (e.g., from data center 120) and perform some or all of a default selection process locally. A default selection process is described further, for example, in connection with FIGS. 6-8F. Once a default selection is made, asset display module 320 may present a link to directly access the default selection from the program information screen. According to implementations described herein, asset display module 320 may also present a metadata narrative in the program information screen to provide context for the default selection.

Although FIG. 3 shows exemplary functional components of user device 170, in other implementations, user device 170 may include fewer components, different components, or additional components than depicted in FIG. 3. Alternatively, or additionally, one or more functional components of user device 170 may perform one or more other tasks described as being performed by one or more other functional components of use device 170. Furthermore, one or more functional components of FIG. 3 may be performed on a different device. For example, in some implementations, some or all functions of asset display module 320 may be performed by a device in data center 120.

Figure 4:
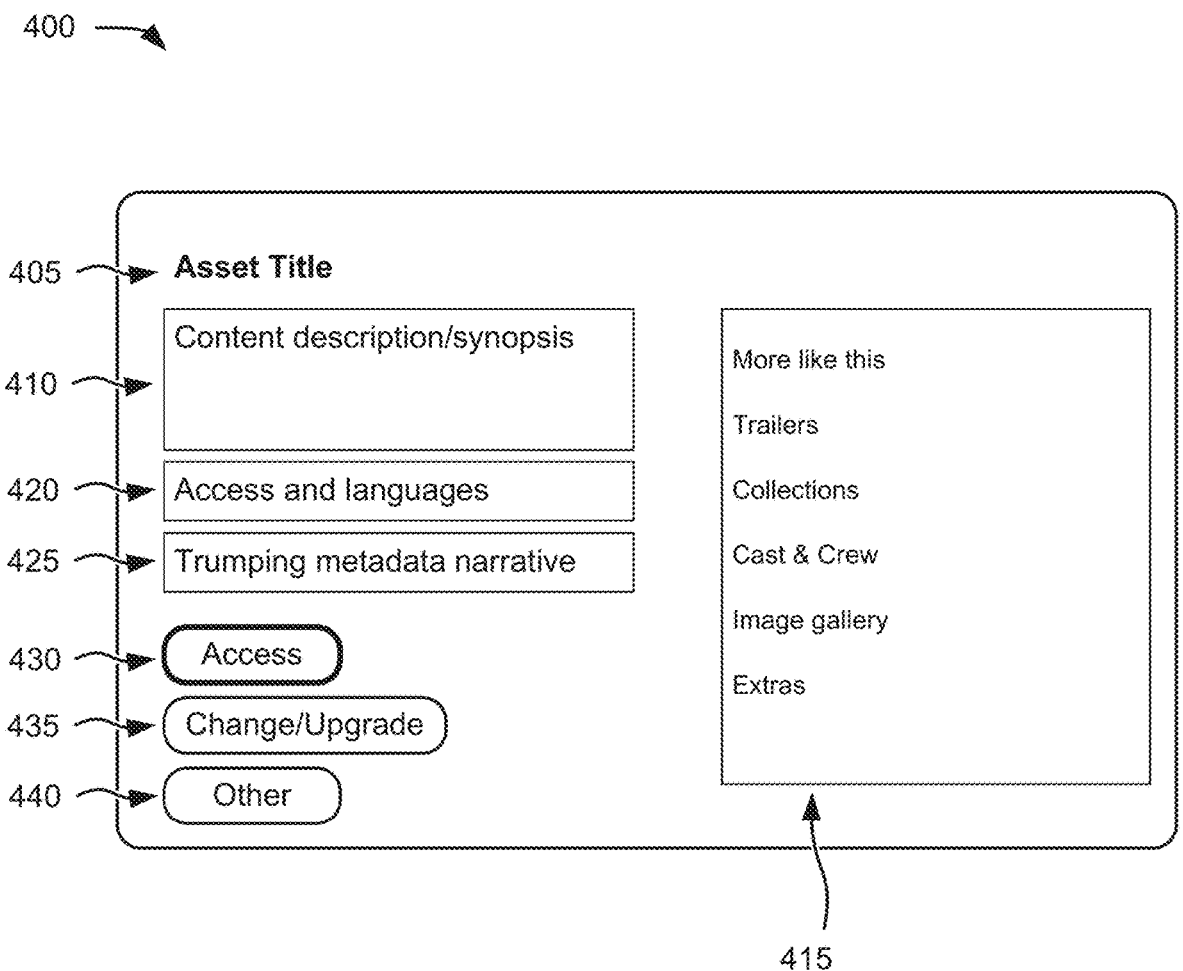
FIG. 4 is a simplified schematic of a program information screen 400 that may be populated, for example, by the asset display module of FIG. 3.

FIG. 4 provides a simplified schematic of a program information screen 400 that may be populated, for example, by asset display module 320. As shown in FIG. 4, asset display module 320 may populate fields in a program information screen 400. Generally, program information screen 400 may provide a description and platform from which to launch or play a select asset. Program information screen 400 may include an asset title field 405, a content description/synopsis field 410, a related content field 415, an access and languages field 420, a trumping metadata narrative field 425, an access button 430, a change/upgrade button 435, and an other button 440.

Title field 405 may include a title of an asset selected by a user. Content description/synopsis field 410 may include a description or summary of the program corresponding to the selected title. Related content field 415 may include links to additional content corresponding to the selected title, such as movie trailers, actor/actress information, pictures, deleted scenes, etc. Data for title field 405, content description/synopsis field 410, and related content field 415 may be obtained, for example, from data center 120 and may be consistent across multiple asset variants (e.g., for the same asset).

Access and languages field 420 may include metadata regarding availability of alternative languages for an asset variant, particularly the asset variant selected by default selection engine 124 for presentation on program information screen 400. Different asset variants may have different services and/or languages available. Access and languages field 420 may indicate, for example, whether services such as SAP, DVS, and closed captioning are available for an asset variant. Access and languages field 420 may also indicate languages available for the asset variant, such as English, Spanish, French, etc. Information for access and languages field 420 may be obtained from catalog data for the asset variant (e.g., from catalog server 122).

Trumping metadata narrative field 425 may include a description or relevant information to identify the asset variant selected by default selection engine 124 for presentation on program information screen 400. Trumping metadata narrative field 425 may indicate, for example, which asset variant was selected (e.g., TVOD, SVOD, PPV, a premium channel, etc.), the asset variant status in relation to the user (e.g., rental time period, purchase date, subscription source/period, DVR status, next airing scheduled, etc.), and/or purchase, rental, subscription or options. Information for trumping metadata narrative field 425 may be determined from user profile data (e.g., from profile server 130), local device data (e.g., a DVR connected to user device 170), and/or catalog data for the asset variant (e.g., from catalog server 122).

Access button 430 may include a selection button to access the asset variant selected by default selection engine 124 for presentation on program information screen 400. Access button 430 may include, for example, a "Watch" button when a user already is eligible to view the access variant. The "Watch" button may include a link to VCMS 110 to obtain the selected asset variant, including, for example, a particular source/channel, language, resolution.

Change/upgrade button 435 may enable a user to select other asset variants (e.g., different than the default asset variant selected by default selection engine 124 for presentation on program information screen 400). Change/upgrade button 435 may include an option to purchase or rent an asset variant, when a default option is not available to watch (e.g., without an additional purchase confirmation). In one implementation, change/upgrade button 435 may include multiple buttons (e.g., one to buy, one to rent an asset variant). Other button 440 may include other options that may be related to the asset variant selected by default selection engine 124 for presentation on program information screen 400. For example, other button 440 may include an option to manage a DVR recording, see an extended preview, or link to social media.

While FIG. 4 include exemplary fields for program information screen 400, in other implementations, program information screen 400 may include different fields, fewer fields, or additional fields than those described in FIG. 4.

Figure 5:
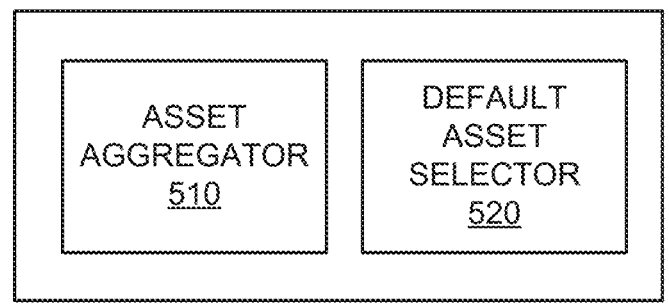
FIG. 5 is a block diagram of exemplary functional components of the default selection engine of FIG. 1.

FIG. 5 is a diagram of exemplary functional components of default selection engine 124. In one implementation, the functions described in connection with FIG. 4 may be performed by one or more components of device 200 (FIG. 2), such as processing unit 220 executing instructions store in memory 230. As shown in FIG. 4, default selection engine 124 may include an asset aggregator 510 and a default asset selector 520.

Asset aggregator 510 may identify aggregated universal program information for a selected asset. For example, in response to a user's search/selection of a movie title (e.g., from a recommendation page, catalog page, search term, etc.), asset aggregator 510 may identify variations of the asset available from different sources. Output of asset aggregator 510 may be referred to as "aggregated universal program information," which may include all asset variations for a particular asset selected by a subscriber. In another implementation, asset aggregator 510 may limit aggregated universal program information to asset variations to which a specific subscriber is currently entitled.

Default asset selector 520 may select a default asset variant from the aggregated universal program information corresponding to a user's selection. More particularly, using trumping logic, default asset selector 520 may determine which asset variant to play when the user selects a "Watch" button, based on, for example, the user's available asset variants plus any resume point(s), network/bandwidth considerations, and resolution. Thus, default asset selector 520 may prevent having to display multiple watching options (e.g., "Watch from HBO" or "Watch from DVR" or "Watch purchased VOD") for a single asset variant. The default selection may be selected as the "best" selection for a particular user, where "best" may be defined as the asset variant that enables the optimal user experience based on subscriber cost, limited advertising, content quality/resolution, language, etc. Thus, a user can be assured of viewing the best available asset variant without having to search through metadata descriptions and/or understand the benefits of each asset variant. In addition, default asset selector 520 may cause user device 170 (e.g., asset display module 320) to display relevant metadata on the program information screen that pertains to the default (or "trumped") asset variant choice.

Figure 6:
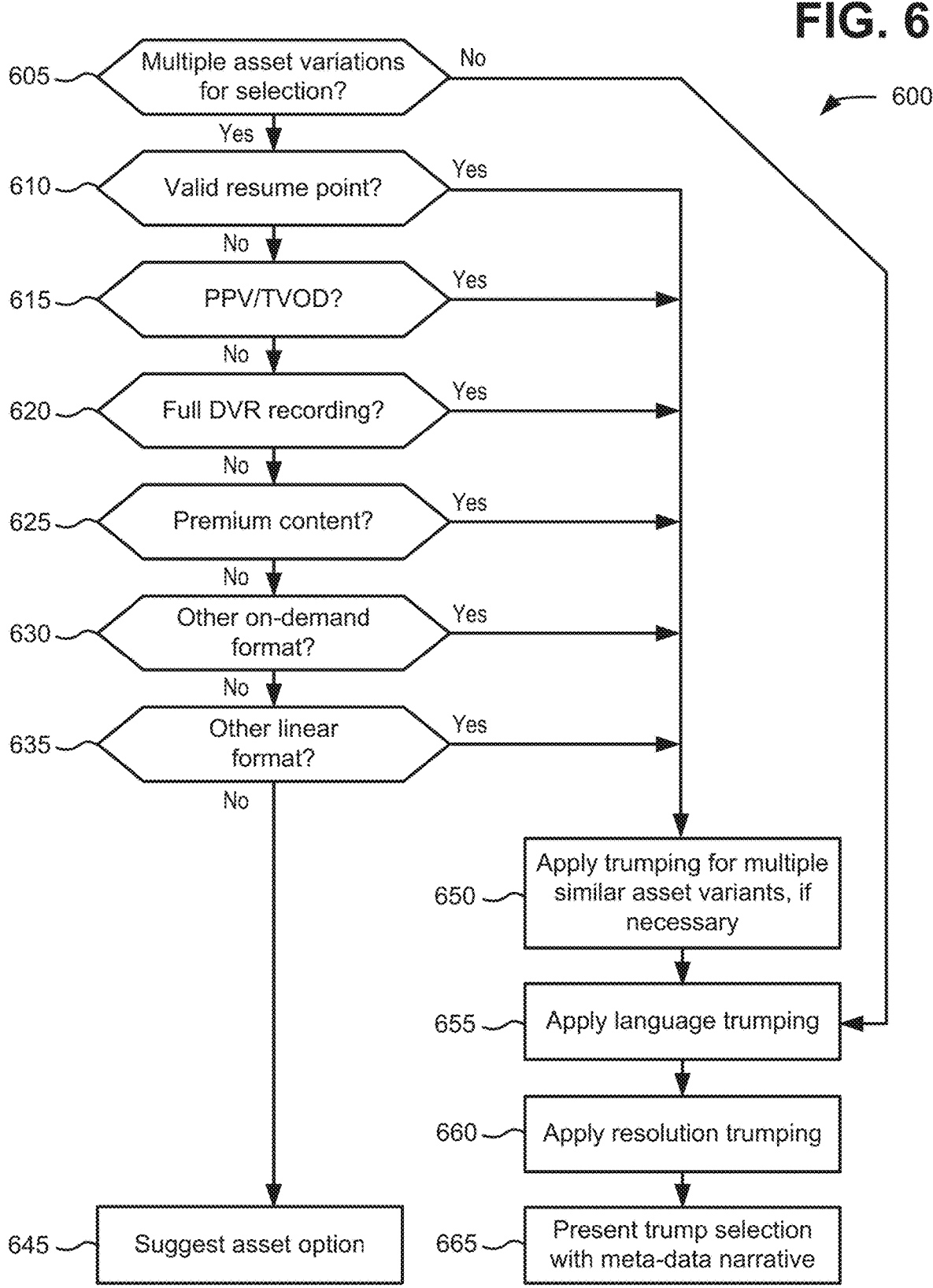
FIG. 6 is a flow diagram of an exemplary process for providing default selections among aggregated universal program information.

FIG. 6 provides an exemplary decision process 600 for selecting a default asset variant from aggregated universal program information (e.g., for a selected asset). In one implementation, decision process 600 may be performed by default asset selector 520 in response to receiving aggregated universal program information from asset aggregator 510.

At block 605, default asset selector 520 may check for multiple asset variants. For example, default asset selector 520 may identify (e.g., from asset aggregator 510) if a user has access to multiple asset variants for a selected title. If there are not multiple variants (block 605—No), default asset selector 520 may proceed to block 655 to identify a default language for the single asset, as described further below. If there are multiple variants (block 605—Yes), a default selection process may be implemented using the sequence starting at block 610 described below.

At block 610, default asset selector 520 may determine if an asset variant has a resume point. For example, default asset selector 520 may use a delivery preference from a previous viewing until an asset content type (e.g., live/DVR/catch-up versus VOD) is no longer available or entitled to be viewed. In one implementation, there may be exceptions to defaulting to a previously-viewed version. First, when the user chooses an airing (e.g., source, channel and/or time) via a channel page/upcoming selection, channel page/just missed section, etc—then default asset selector 520 may play the exact airing that the user chooses without respect a resume point or other default selection rules. Second, if the user purchases TVOD after a resume point exists for a different asset variant, default asset selector 520 may ignore the previous resume point and trump from the earlier asset variant. In other words, default asset selector 520 may always choose a TVOD asset variant if available. If a TVOD resume point is available, default asset selector 520 will play from the TVOD resume point for the user. If at least one asset variant from the aggregated universal program information is detected with a valid resume point at block 610 (block 610—Yes), default asset selector 520 may proceed to block 650 to apply trumping for multiple similar asset variants, as described further below. If exactly one asset variant meets trumping criteria based on a resume point, that asset variant may be selected for presentation on the user's screen. If there are no asset variants with a valid resume point (block 610—No), the selection process may proceed to block 615 to consider the remaining asset variants.

At block 615, default asset selector 520 may check for eligible asset variants from PPV or TVOD orders, which may generally be considered advertisement-free formats. For example, default asset selector 520 may identify one or more asset variants from a previously-purchased PPV title, a PPV time block, a TVOD purchase, or a TVOD rental. If at least one asset variant from the aggregated universal program information is detected from PPV or TVOD at block 615 (block 615—Yes), default asset selector 520 may proceed to block 650 to apply trumping for multiple similar asset variants, as described further below. If exactly one asset variant is available from PPV or TVOD, that asset variant may be selected for presentation on the user's screen. If there are no asset variants from PPV or TVOD (block 615—No), the selection process may proceed to block 620 to consider the remaining asset variants.

At block 620, default asset selector 520 may determine if a full DVR recording of the asset is available. For example, default asset selector 520 may determine from the aggregated universal program information or from profile server 130 whether a complete DVR recording for the asset is available to the subscriber. If at least one asset variant from the aggregated universal program information is detected with a full DVR recording at block 620 (block 620—Yes), default asset selector 520 may proceed to block 650 to apply trumping for multiple similar asset variants, as described further below. If a full DVR recording is not available (block 620—No), the selection process may proceed to block 625 to consider premium content.

At block 625, default asset selector 520 may identify if an asset variant is available from a premium source (e.g., a premium channel for a cable subscription that requires an add-on subscription). For example, default asset selector 520 may determine from the aggregated universal program information whether an asset variant is available to the subscriber on a premium channel, such as HBO, SHOWTIME, CINEMAX, etc. If at least one asset variant from the aggregated universal program information is detected as being available to the subscriber on a premium channel at block 625, default asset selector 520 may proceed to block 650 to apply trumping for multiple similar asset variants, as described further below. If a premium content asset variant is not available (block 625—No), the selection process may proceed to block 630 to consider other on-demand formats.

At block 630, default asset selector 520 may identify if an asset variant is available from other non-linear sources. For example, default asset selector 520 may determine from the aggregated universal program information whether an asset variant is available to the subscriber from an AVOD source. Generally, AVOD asset variants are the only type of VOD variants that may require ad insertion. Therefore, AVOD may contain assets that should be ad-supported, as well as other content, which should not contain any additional advertisements. In order to clearly define content that may have ads inserted, a Boolean InsertAds field (with a default to FALSE) can be inserted into the content metadata at ingestion (e.g., by ingestion server 116) for all AVOD assets. In one implementation, a false value in the InsertAds field may be used as a proxy for "trick mode disabled." If the InsertAds field=FALSE, then client applications on user device 170 will be expected to disable features such as fast forward and/or skip-forward for the asset variant. Enabling of trick play features is considered preferable between asset variants. If at least one asset variant meets trumping criteria based on trick play being enabled at block 630 (block 630—Yes), default asset selector 520 may proceed to block 650 to apply trumping for multiple similar asset variants, as described further below. If no asset variants meets trumping criteria based on trick play being enabled (block 630—No), the selection process may proceed to block 635 to consider premium content.

At block 635, default asset selector 520 may determine if an asset variant is available from other linear content. For example, default asset selector 520 may determine from the aggregated universal program information whether an asset variant is available to the subscriber on a basic channel with advertising. If at least one asset variant from the aggregated universal program information is detected as being available to the subscriber on a basic channel at block 635 (block 635—Yes), default asset selector 520 may proceed to block 650 to apply trumping for multiple similar asset variants, as described further below. If multiple linear content options exist, default asset selector 520 may choose an asset variant with a catch-up feature (e.g., a multi-day replay) available, selecting the earliest aired version. However, if the selected asset is a sporting event, default asset selector 520 may select a live (or currently broadcasting) asset variant with catch-up. If no asset variant with catch-up is available, default asset selector 520 may select a linear content version with advertising that is currently airing, using the closest start time. If no current linear broadcast is available, default asset selector 520 may select a partial DVR recording, if available. If at least one asset variant meets trumping criteria based another liner format at block 6350 (block 635—Yes), default asset selector 520 may proceed to block 650 to apply trumping for multiple similar asset variants, as described further below. Otherwise, default asset selector 520 may proceed to block 645.

At block 645, if none of the previous decision points identify an asset variant available to the subscriber, default asset selector 520 may suggest other options for the subscriber to access the selected asset (e.g., using change/upgrade button 435 without providing an access button 430). Default asset selector 520 may identify a suggested asset variant that can be obtained by user device 170 at a later time or via a new transaction. For example, default asset selector 520 may identify TVOD options to which a user is currently not entitled, such as an asset variant for an expired TVOD rental that is available for re-purchase. If there is no asset variant with an expired TVOD rental, default asset selector 520 may provide a TVOD pre-order option for the asset, including an indication of the availability date. Alternatively, default asset selector 520 may identify an upcoming airing for the selected asset. In one implementation, default asset selector 520 may determine if a recording for the upcoming airing is already scheduled and, if so, provide a recording schedule (e.g., in trumping metadata narrative field 425). In another implementation, default asset selector 520 may determine if the upcoming airing for the asset variant is new or a rebroadcast, and provide an indication to the user. Further, if no other options are available, default asset selector 520 may identify a TVOD asset variant that is available to the user for purchase and/or rent.

At block 650, default asset selector 520 may select from multiple asset variants with the same criteria. Thus, when more than one asset variant is available through a decision point (e.g., decision points 610-635), default asset selector 520 may select an asset variant that provides a better user experience among the selected asset variants from a particular decision point. A better user experience may be determined based on the ability to limit/eliminate advertisements presented the user, along with other factors, such as providing the highest available video quality and selecting a preferred language, as described further below. For example, default asset selector 520 may select an asset variant with available catch-up or trick play features over traditional live linear content without such features. In another example, live versions of outcome-dependent events (e.g., live sports) with catch-up features may be selected over replay asset variants.

At block 655, if there are multiple versions available for the asset/title in the user's default language (e.g., as indicated in a user profile from profile server 130), then default asset selector 520 may apply trumping in the following order.

(1) If TVOD is available, the TVOD asset variant is chosen asset to play for the user. In that case, play the TVOD asset variant in the user's default language. A user can switch the language and DVS options through transport control.

(2) If there are multiple airings in various languages available for the title, then a modal window may be used to show the options for the airings available in the order of trumping (e.g.: View Gladiator on "StarZ HD in English," "Hiten HD in Spanish," etc.). The user can choose which airing to play. The modal window may present all the English airings as well as the other languages. The order presented may follow trumping guidelines for content/quality. In other words, if a premium channel airing is available, the premium channel airing would be shown. Another example is the user is on the episode information level for a baseball game. In this case, the modal window shows if the game is airing on two channels and at least one of them is an airing in a language other than English (e.g., a baseball game is airing on Univision in Spanish, and on another network in English).

(3) If there are multiple airings in various languages, but none of them are the user's default language or English, then default asset selector 520 may direct presentation of a modal window to show options for the available airings.

At block 660, default asset selector 520 may apply asset quality trumping. Generally, default asset selector 520 may choose, from the remaining asset variants, the highest available video quality, where 4K HDR>4K SDR>HD HDR>HD>SD supported by user device 170. When user device 170 is an STB, VCMS 110 may return the highest video quality resolution for which the user (e.g., subscriber) is eligible. The STB can determine and retrieve the appropriate version if the STB is not compatible for the highest available resolution available to the user. When user device 170 is a mobile device or another consumer electronics device, VCMS 110 may return all available resolutions for an asset available to the media player application residing on the mobile device. The media player may select and play the compatible version (e.g., based on device capabilities, signal strength, etc.) from the available resolutions provided from VCMS 110.

At block 665, default asset selector 520 may present the default asset variant selection with the corresponding metadata narrative for the user. For example, default asset selector 520 may instruct asset display module 320 to present fields in program information screen 400, including trumping metadata narrative field 425 and access button 430 with a link for the particular default selection (e.g., based on results from decision points 610-635 and trumping guidelines in blocks 650-660).

In another implementation, default asset selector 520 may apply mobile out-of-home (OOH) trumping. If the subscriber's DVR is not accessible to user device 170 or is not available, then default asset selector 520 may instruct user device 170 to play the selected asset from an asset variant that has a catch-up feature. If the user is OOH and has no OOH rights to a selected channel, default asset selector 520 may instruct presentation of an AVOD asset variant.

Although FIG. 6 shows an exemplary decision process 600 for selecting a default asset variant, in other implementations, default asset selector 520 may include fewer decision points, different decision points, differently-arranged decision points, or additional decision points than those depicted in FIG. 6.

FIGS. 7A-7E provides an example of a default selection plan 700 for selecting among aggregated universal program information. Selection plan 700 may be generated, for example, based on decision process 600 described above to implement asset variants available as PPV, TVOD, SVOD, AVOD, premium channel linear content, and linear content with advertising available from VCMS 110, as well as a user's DVR content. In other implementations, a default selection plan may include other types of asset variants. Selection plan 700 may be, for example, stored in memory 230 and executed by processing unit 220 of default asset selector 520.

Options from aggregated universal program information (e.g., asset variants corresponding to a user's selected title) may be compared against fields in selection plan 700 to identify a default asset variant for presentation on program information screen 400. Selection plan 700 may include a trumping priority field 710, a content type field 720, an airing field 730, a multiple asset choice field 740, a language field 750, a content version field 760, and a metadata narrative field 770 with a variety of entries. In other implementations, selection plan 700 may include fewer, additional, or different fields than shown in FIGS. 7A-7E.

Trumping priority field 710 may include a unique trumping priority or ranking associated with a type of asset variant. In the example of selection plan 700, seventeen trumping ranks (i.e., 0 through 16) are provided.

Content type field 720 may include a content type or source for an asset variant. Content types for content type field may generally include, for example, PPV, TVOD, SVOD, AVOD, premium channel linear content, linear content with advertising, and DVR content. Other distinctions within entries for content type field 720 may include rental, purchase, preorder, etc. Airing field 730 may include an indication of presentation availability for the asset of content type field. For example, airing field 730 may distinguish between live linear content (e.g., "airing now") and content using catch-up features (e.g., "catch up"). Airing field 730 may also distinguish between full and partial DVR recordings. Default asset selector 520, for example, may match options from aggregated universal program information with entries in content type field 720 and airing field 730 to determine options (e.g., asset variants) with the highest ranking (or lowest numerical value) in a corresponding trumping priority field 710.

Multiple asset choice field 740 may provide guidance to select between two asset variants with the same value in trumping priority field 710. In one implementation, multiple asset choice field 740 may be applied by default asset selector 520 to asset variants tied for a highest value in trumping priority field 710. Multiple asset choice field 740 may be blank for content types that cannot have multiple asset variants, such as PPV.

Language field 750 may provide guidance to select a presentation language for a selected default asset variant. For example, when default asset selector 520 selects a default option from aggregated universal program information, information in language field 750 may be used to select an initial language based on criteria in language field 750 (e.g., "User Default>English>other languages"). Upon selection of a "watch" option (e.g., access button 430) by a user, the selected asset variant may be present with audio in the default option from language field 750.

Content version field 760 may provide guidance to select a presentation resolution for a selected default asset variant. For example, when default asset selector 520 selects a default option from aggregated universal program information, information in content version field 760 may be used to select resolution based on criteria in content version field 760 (e.g., "4K SDR>HD HDR>HD>SD"). Upon selection of a "watch" option (e.g., access button 430) by a user, the selected asset variant may be present with resolution in the default option from content version field 760.

Metadata narrative field 770 may provide text to present in program information screen 400 (e.g., trumping metadata narrative field 425) for a selected default asset variant. For example, when default asset selector 520 selects a default option from aggregated universal program information, information in metadata narrative field 770 may be used to populate trumping metadata narrative field 425, thus providing context for the user for selecting the "watch" option (or another option) of access button 430.

FIGS. 8A-8F include simplified examples of program information screen 400 with default selection results based on selection plan 700. As shown in FIGS. 8A-8F, each of the asset variants include a common title for asset title field 405 (e.g., "Jungle Book), a common description for content description/synopsis field 410, and common options for related content field 415 for a set of aggregated universal program information. Data for asset title field 405, content description/synopsis field 410, and related content field 415 may be obtained from data center 120 (e.g., catalog server 122). Data presented in corresponding fields 420 through 440 may vary depending on the selection of a default asset variant.

FIG. 8A is an example of program information screen 400 when a currently-rented TVOD title (e.g., corresponding to level 2 of trumping priority field 710 in selection plan 700) is presented as a default selection from aggregated universal program information. As shown in FIG. 8A, trumping metadata narrative field 425 is populated with a phrase from metadata narrative field 770 corresponding to level 2 of trumping priority field 710 (e.g., "HD rental expires on . . . "), where resolution descriptors and rental dates are obtained from profile server 130. Similarly, access and languages field 420 may be populated with available languages for the rented TVOD asset variant. Access button 430 may provide a link to view (e.g., stream) the rented TVOD asset variant of the "Jungle Book" title. Change/upgrade button 435 may provide a link to buy the TVOD asset variant.

FIG. 8B is an example of program information screen 400 when a previously purchased TVOD title (e.g., corresponding to level 1 of trumping priority field 710 in selection plan 700) is presented as a default selection from aggregated universal program information. As shown in FIG. 8B, trumping metadata narrative field 425 is populated with a phrase from metadata narrative field 770 corresponding to level 1 of trumping priority field 710 (e.g., "Purchased in HD on . . . "), where resolution descriptors and purchase dates are obtained from profile server 130. Similarly, access and languages field 420 may be populated with available languages for the purchased TVOD asset variant. Access button 430 may provide a link to view (e.g., stream) the purchased TVOD asset variant of the "Jungle Book" title. Change/upgrade button 435 may provide a link to upgrade the TVOD asset variant (e.g., to a higher resolution).

Figure 8C:
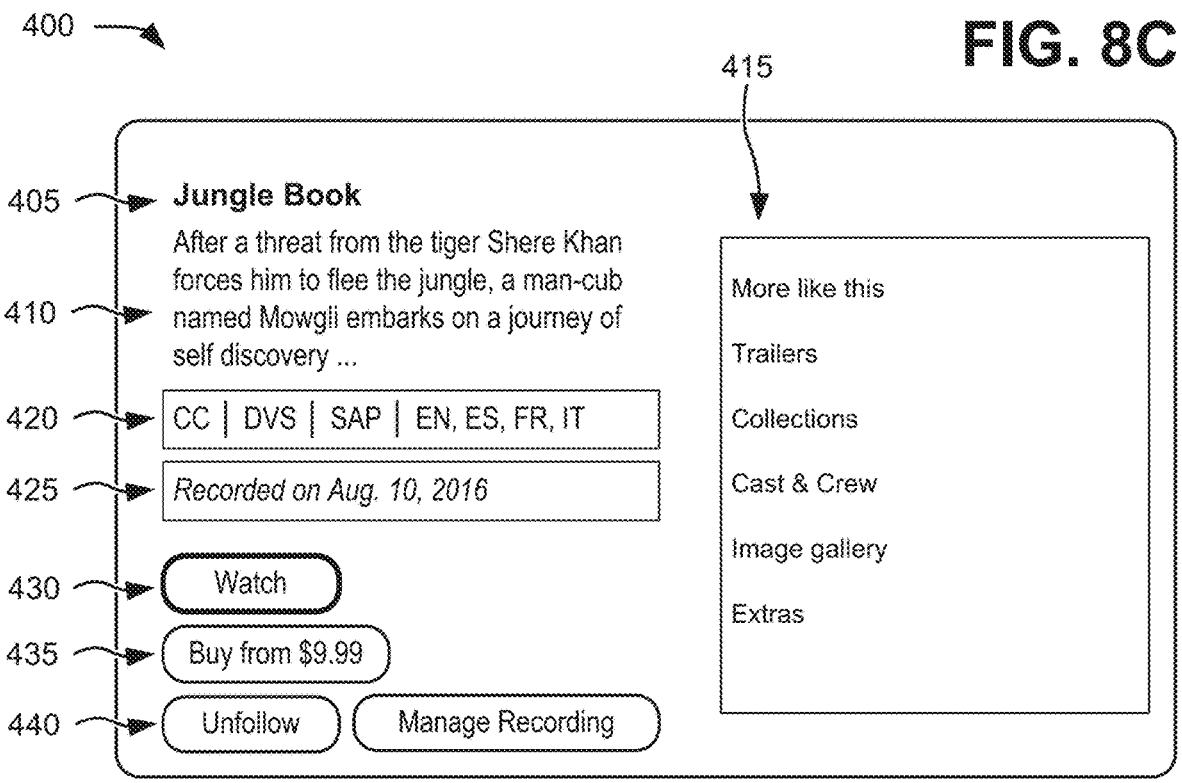

FIG. 8C is an example of program information screen 400 when a previously recorded DVR title (e.g., corresponding to level 3 of trumping priority field 710 in selection plan 700) is presented as a default selection from aggregated universal program information. As shown in FIG. 8C, trumping metadata narrative field 425 is populated with a phrase from metadata narrative field 770 corresponding to level 3 of trumping priority field 710 (e.g., "Recorded on . . . "), where recording dates are obtained from user device 170 (e.g., a DVR) or profile server 130. Similarly, access and languages field 420 may be populated with available languages for the recorded DVR asset variant. Access button 430 may provide a link to view the recorded DVR asset variant of the "Jungle Book" title. Change/upgrade button 435 may provide a link to purchase a TVOD asset variant (e.g., when the TVOD asset is only available for purchase), and other button 440 may include options including managing DVR recordings.

Figure 8D:
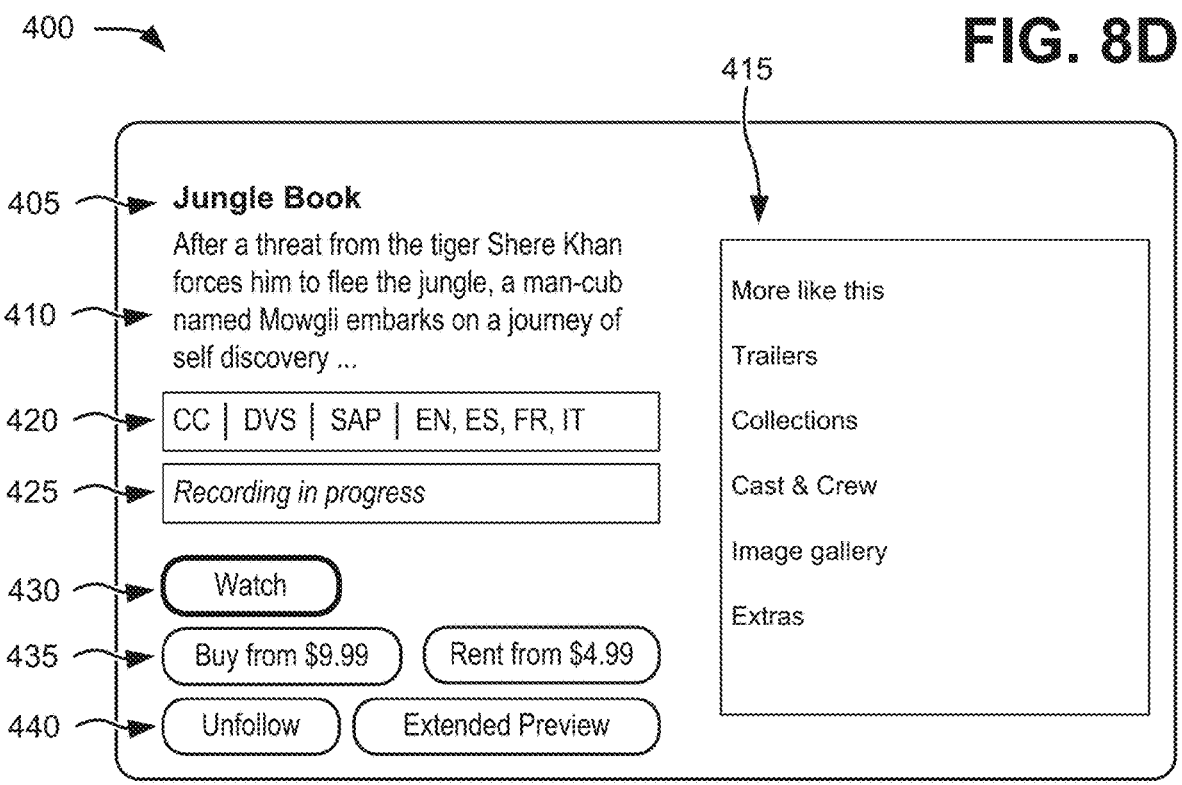

FIG. 8D is an example of program information screen 400 when ongoing DVR recording (not shown in selection plan 700) is presented as a default selection from aggregated universal program information. As shown in FIG. 8D, trumping metadata narrative field 425 may populated with a phrase from metadata narrative field 770 corresponding to trumping priority field 710 (e.g., "Recording in progress . . . "), where recording status may be obtained from user device 170 (e.g., a DVR). Similarly, access and languages field 420 may be populated with available languages for the in-progress DVR asset variant. Access button 430 may provide a link to view the DVR asset variant of the "Jungle Book" title (e.g., from the beginning). Change/upgrade button(s) 435 may provide links to purchase or rent a TVOD asset variant (e.g., when the TVOD asset is available for both purchase and rent), and other button 440 may include options including accessing an extended preview.

Figure 8E:
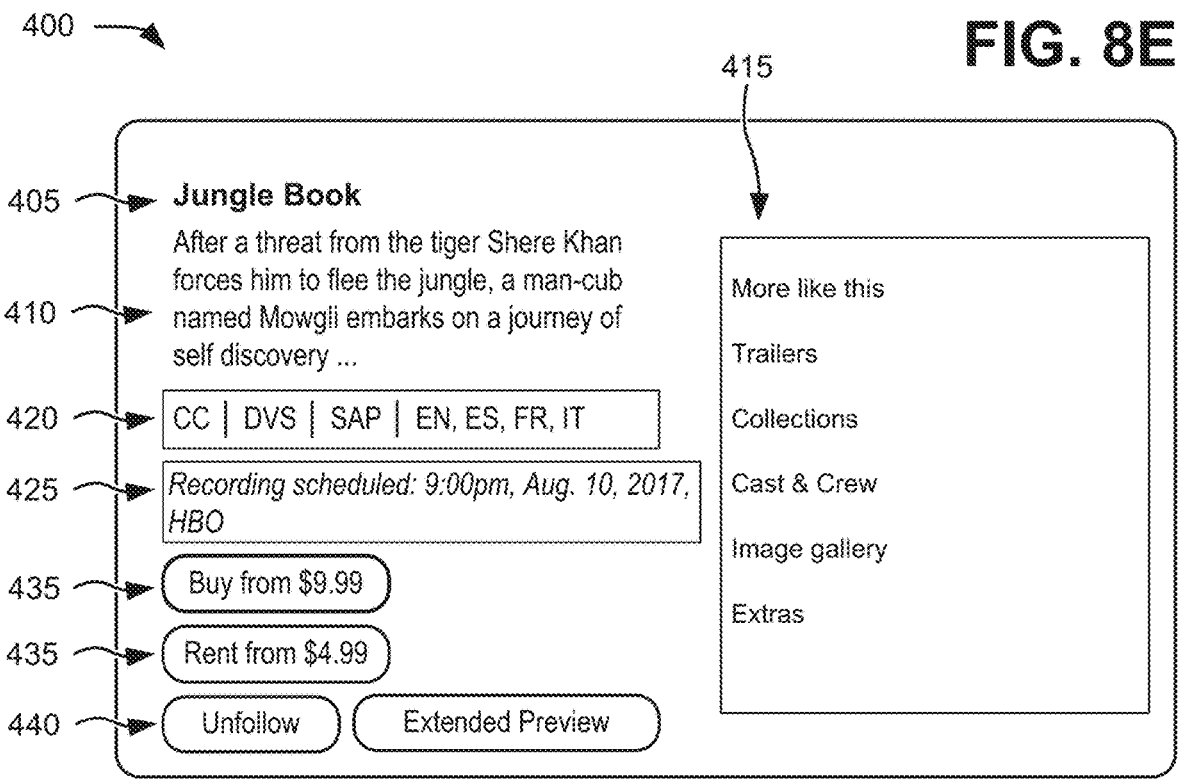

FIG. 8E is an example of program information screen 400 when a scheduled DVR recording of a selected asset title (e.g., corresponding to level 15 of trumping priority field 710 in selection plan 700) is presented as a default selection from aggregated universal program information. As shown in FIG. 8E, trumping metadata narrative field 425 is populated with a phrase from metadata narrative field 770 corresponding to level 15 of trumping priority field 710 (e.g., "Recording scheduled . . . "), where scheduled recording dates are obtained from user device 170 (e.g., a DVR) or profile server 130. Similarly, access and languages field 420 may be populated with available languages for the DVR asset variant to be recorded. Access button 430 may not be shown, since no DVR access is currently available. Change/upgrade button(s) 435 may provide links to purchase or rent a TVOD asset variant (e.g., when the TVOD asset is available for both purchase and rent), and other button 440 may include options including accessing an extended preview.

Figure 8F:
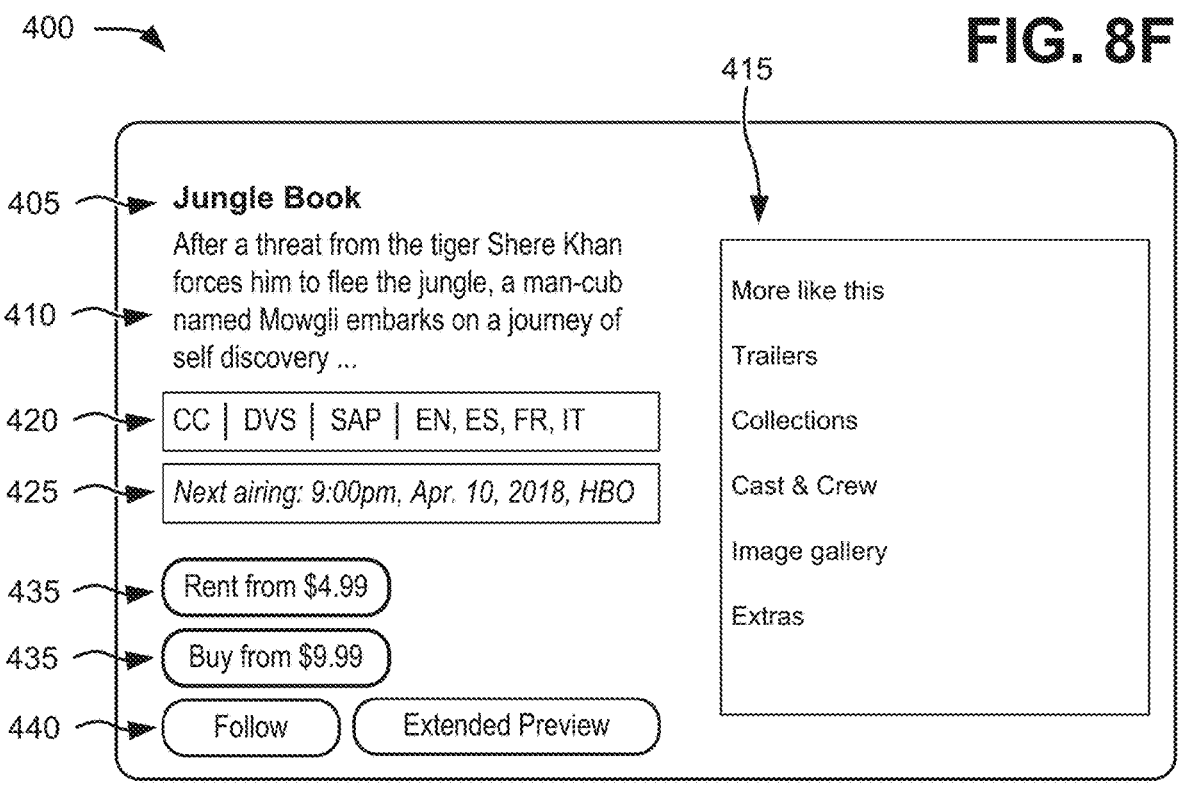

FIG. 8F is an example of program information screen 400 when an upcoming airing of a selected asset title, with no recording scheduled (e.g., again corresponding to level 15 of trumping priority field 710 in selection plan 700), is presented as a default selection from aggregated universal program information. As shown in FIG. 8F, trumping metadata narrative field 425 is populated with a phrase from metadata narrative field 770 corresponding to level 15 of trumping priority field 710 (e.g., "Next airing . . . "), where scheduled airing dates are obtained from catalog server 122. Similarly, access and languages field 420 may be populated with available languages for the scheduled airing of the asset variant. Access button 430 may not be shown, since no content corresponding to the selected title is currently available to the user. Change/upgrade button(s) 435 may provide links to purchase or rent a TVOD asset variant (e.g., when the TVOD asset is available for both purchase and rent), and other button 440 may include options including accessing an extended preview.

Systems and methods described herein may present to a user a single option when multiple sources (such as recording, on-demand, live airing, etc.) of a video asset exist in aggregated universal program information. The systems and methods compare metadata from asset variants along with user profile data to identify which option will provide the best user experience for the selected video asset. The systems and methods provide a link to the default asset variant along with a metadata narrative to provide context for the default asset variant. The systems and methods simplify the user experience to avoid forcing the user to research available features and choose between multiple asset variants as well as avoiding viewing assets for a brief period of time before selecting a different asset variant.

The foregoing description of implementations provides illustration and description, but is not intended to be exhaustive or to limit the invention to the precise form disclosed. Modifications and variations are possible in light of the above teachings or may be acquired from practice of the invention. For example, while a series of blocks have been described with regard to FIG. 6, the order of the blocks may be modified in other embodiments. Further, non-dependent blocks may be performed in parallel.

Certain features described above may be implemented as "logic" or a "unit" that performs one or more functions. This logic or unit may include hardware, such as one or more processors, microprocessors, application specific integrated circuits, or field programmable gate arrays, software, or a combination of hardware and software.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method performed by one or more computing devices in a service provider network, the method comprising:
receiving aggregated universal program information for a selected video asset, wherein the aggregated universal program information includes two or more asset variants;
identifying, from the aggregated universal program information and based on a user profile, that more than one of the asset variants are available to a subscriber;
determining, from the user profile, that none of the asset variants available to the subscriber includes a resume check point;
determining, from content metadata for the asset variants, that none of the asset variants available to the subscriber includes an advertisement-free format;
determining, from the content metadata for the asset variants or the user profile, that none of the asset variants available to the subscriber includes a digital video recorder (DVR) recording, determining, from the content metadata for the asset variants, that none of the asset variants available to the subscriber is provided via a premium channel;
determining, from the content metadata for the asset variants, that none of the asset variants available to the subscriber is provided via another on-demand format;
determining, from the content metadata for the asset variants, whether one of the asset variants available to the subscriber is provided via another linear format, and assigning the asset variant on the other linear format as a default selection when it is determined that the one of the asset variants is provided via the other linear format; and
instructing a user device to present, on a program information screen for the selected video asset, an access button for viewing the default selection and a corresponding metadata narrative that indicates a source for the default selection, when one of the asset variants is assigned as the default selection.

2. The method of claim 1, further comprising: determining, from the user profile, a default language for the subscriber, wherein the access button further directs playback in the default language.

3. The method of claim 1, further comprising: determining, from the user profile, a resolution supported by the user device, wherein the access button further directs playback in a highest available resolution supported by the user device.

4. The method of claim 1, further comprising: when none of the asset variants available to the subscriber is assigned as the default selection, identifying a suggested asset variant that can be obtained by the user device at one of: a later time, or a new transaction.

5. The method of claim 1, wherein determining that none of the asset variants available to the subscriber includes the advertisement-free format includes failing to identify one of the asset variants as one of a pay-per-view (PPV) asset variant, a purchased transactional video-on-demand (TVOD) asset variant, or a rented TVOD asset variant.

6. The method of claim 1, further comprising: determining, from the content metadata for the asset variants, that none of the asset variants is accessible via subscription VOD (SVOD.

7. The method of claim 1, wherein assigning the asset variant on the other linear format as the default selection further comprises: selecting from multiple asset variants with the same criteria based on trumping guidelines.

8. The method of claim 1, wherein assigning the asset variant on the other linear formal: as the default selection when it is determined that the one of the asset variants is provided via the other linear format further comprises: identifying when a trick play feature is enabled for the asset variant, and assigning the version of the asset variant with the trick play feature as the default selection.

9. The method of claim 1, wherein the user device includes at least one of: a set-top box (STB); a cable card; or a smart television.

10. A network device, comprising:
a commutation interface to communicate with a user device;
a memory for storing instructions; and
a processor configured to execute the instructions to:
receive aggregated universal program information for a video asset selected via the user device, wherein the aggregated universal program information includes two or more asset variants;
identify, from the aggregated universal program information and based on a user profile, that more than one of the asset variants are available to a subscriber;
when more than one asset variant is available to the subscriber, determine, from the user profile, whether one of the asset variants includes a resume check point, and assign the asset variant that includes the resume check point as a default selection, when it is determined that the one of the asset variants includes the resume check point; when none of the asset variants available to the subscriber includes the resume check point, determine, from content metadata for the asset variants, whether one of the asset variants includes an advertisement-free format, and assign the asset variant which includes the advertisement-free format as the default selection when it is determined that there is the asset variant which includes the advertisement-free format;
when none of the asset variants available to the subscriber includes the asset variant which includes the advertisement-free format, determine, from the content metadata for the asset variants or the user profile, whether one of the asset variants includes a digital video recorder (DVR) recording, and assign the DVR recording as the default selection when it is determined that the one of the asset variants includes the DVR recording;
when none of the asset variants available to the subscriber includes the DVR recording, determine, from the content metadata for the asset variants, whether one of the asset variants is provided via a premium channel, and assign the asset variant on the premium channel as the default selection when it is determined that the one of the asset variants is provided via the premium channel;
when none of the asset variants available to the subscriber is provided via the premium channel, determine, from the content metadata for the asset variants, whether one of the asset variants is provided via another on-demand format, and assign the asset variant in the other on-demand format as the default selection when it is determined that the one of the asset variants is provided via the other on-demand format;
when none of the asset variants available to the subscriber is provided via the other on-demand format, determine, from the content metadata for the asset variants, whether one of the asset variants is provided via another linear format, and assign the asset variant on the other linear format as the default selection when it is determined that the one of the asset variants is provided via the other linear format; and instruct the user device to present, on a program information screen for the selected video asset, an access button for viewing the default selection and a corresponding metadata narrative that indicates a source for the default selection, when one of the asset variants is assigned as the default selection.

11. The network device of claim 10, wherein the processor is further configured to execute the instructions to: determine, from the user profile, a default language for the subscriber, wherein the access button further directs presentation using the default language.

12. The network device of claim 10, wherein the processor is further configured to execute the instructions to: determine, from the user profile, a resolution supported by the user device, wherein the access button further direct presentation using a highest available resolution supported by the user device.

13. The network device of claim 10, wherein the processor is further configured to execute the instructions to: when none of the asset variants available to the subscriber is assigned as the default selection, identify a suggested asset variant that can be obtained by the user device: at a later time, or via a new transaction.

14. The network device of claim 10, wherein, when determining whether one of the asset variants includes the advertisement-free format, the processor is further configured to execute the instructions to: identify one of the asset variants as one of a pay-per-view (PPV) asset variant, a purchased transactional video-on-demand (TVOD) asset variant, or a rented TVOD asset variant; and select as the default asset variant the PPV asset variant over the purchased TVOD asset variant over the rented TVOD asset variant.

15. The network device of claim 10, wherein, when none of the asset variants available to the subscriber includes the DVR recording, the processor is further configured to execute the instructions to: determine, from the content metadata for the asset variants, whether one of the asset variants is accessible via subscription VOD (SVOD), and assign the asset variant on SVOD as the default selection when it is determined that the one of the asset variants is accessible via SVOD.

16. The network device of claim 10, wherein, when assigning the asset variant on the premium channel as the default selection when it is determined that the one of the asset variants is provided via the premium channel, the processor is further configured to execute the instructions to: identify a replay version of the asset variant, and assign the replay version of the asset variant on the premium channel as the default selection.

17. The network device of claim 10, wherein, when assigning the asset variant on the other linear format as the default selection when it is determined that the one of the asset variants is provided via the other linear format, the processor is further configured to execute the instructions to: identify when a trick play feature is enabled for the asset variant, and assign the version of the asset variant with the trick play feature as the default selection.

18. A non-transitory computer-readable medium, storing instructions executable by one or more processors, the non-transitory computer-readable medium comprising one or more instructions to:

receive aggregated universal program information for a video asset selected via a user device, wherein the aggregated universal program information includes two or more asset variants;

identify, from the aggregated universal program information and based on a user profile that more than one of the asset variants are available to a subscriber;

when more than one asset variant is available to the subscriber, determine, from the user profile, whether one of the asset variants includes a resume check point, and assign the asset variant that includes the resume check point as a default selection when it is determined that the one of the asset variants includes the resume check point;

when none of the asset variants available to the subscriber includes the resume check point, determine, from content metadata for the asset variants, whether one of the asset variants includes an advertisement-free format, and assign the asset variant which includes the advertisement-free format as the default selection when it is determined that there is the asset variant which includes the advertisement-free format;

when none of the asset variants available to the subscriber the asset variant which includes the advertisement-free format, from the content metadata for the asset variants or the user profile, whether one of the asset variants includes a digital video recorder (DVR) recording, and assign the DVR recording as the default selection when it is determined that the one of the asset variants includes the DVR recording;

when none of the asset variants available to the subscriber includes the DVR recording, determine, from the content metadata for the asset variants, whether one of the asset variants is provided via a premium channel, and assign the asset variant on the premium channel as the default selection when it is determined that the one of the asset variants is provided via the premium channel;

when none of the asset variants available to the subscriber is provided via the premium channel, determine, from the content metadata for the asset variants, whether one of the asset variants is provided via another on-demand format, and assign the asset variant in the other on-demand format as the default selection when it is determined that the one of the asset variants is provided via the other on-demand format;

when none of the asset variants available to the subscriber is provided via the other on-demand format, determine, from the content metadata for the asset variants, whether one of the asset variants is provided via another linear format, and assign the asset variant on the other linear format as the default selection when it is determined that the one of the asset variants is provided via the other linear format; and instruct the user device to present, on a program information screen for the selected video asset, an access button for viewing the default selection and a corresponding metadata narrative that indicates a source for the default selection, when one of the asset variants is assigned as the default selection.

19. The non-transitory computer-readable medium of claim 18, further comprising one or more instructions to: determine, from the user profile, a default language for the subscriber, wherein the access button further directs playback in the default language.

20. The non-transitory computer readable medium of claim 19, further comprising one or more instructions to: determine, from the user profile, a resolution supported by the user device, wherein the access button further directs playback in a highest available resolution supported by the user device.

* * * * *